March 7, 1967     H. BLASZKOWSKI     3,307,873
RETRACTABLE SEAT BELT AND METHOD OF MAKING SAME
Filed Jan. 16, 1964                                                                                 2 Sheets-Sheet 1
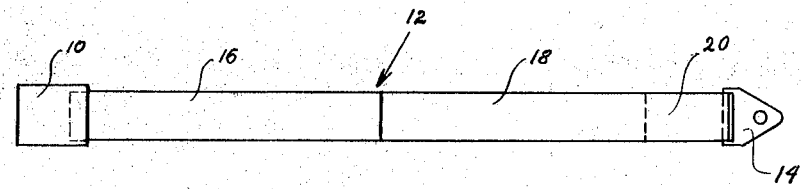
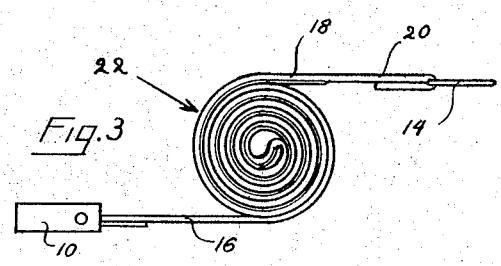
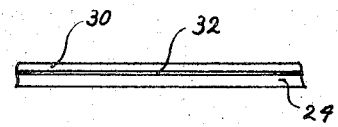
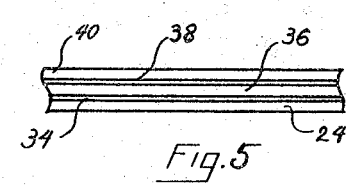
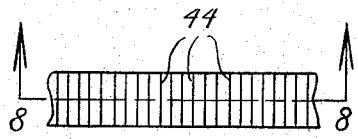
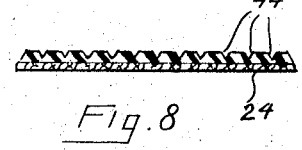
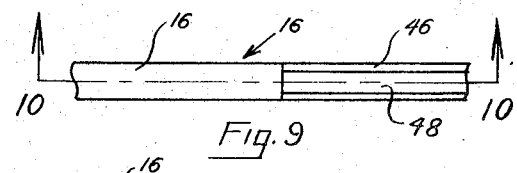
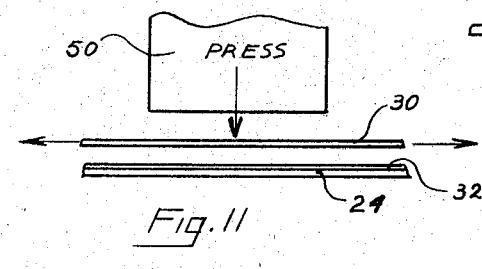
INVENTOR.
HENRY BLASZKOWSKI.
BY
ATTORNEY

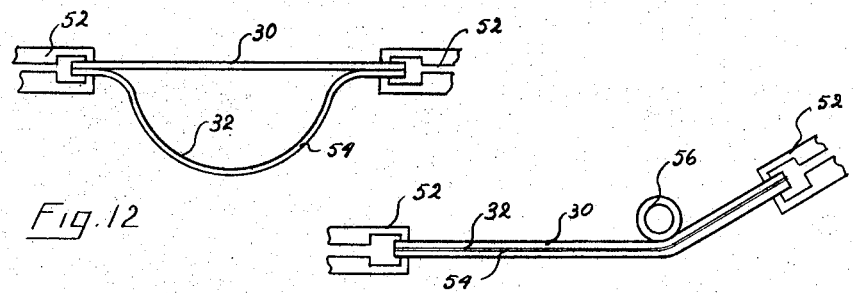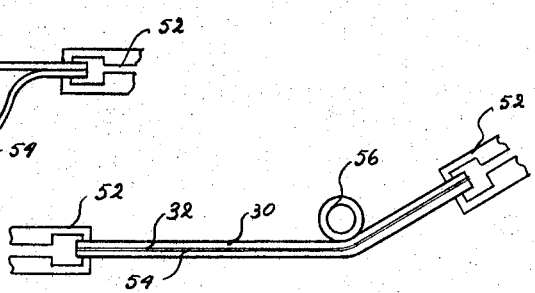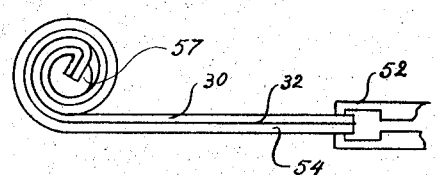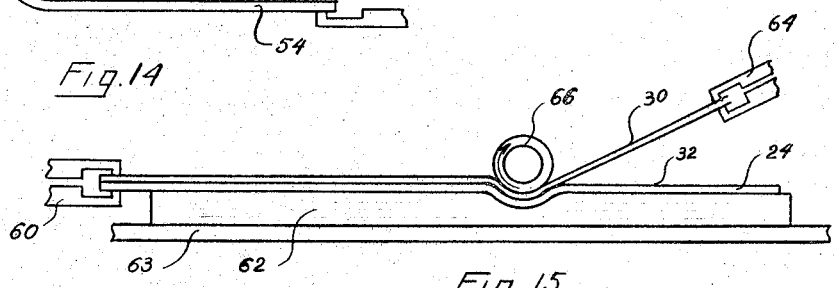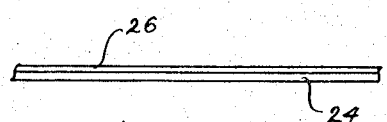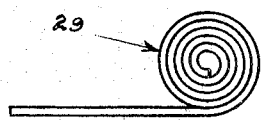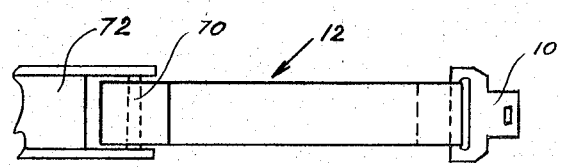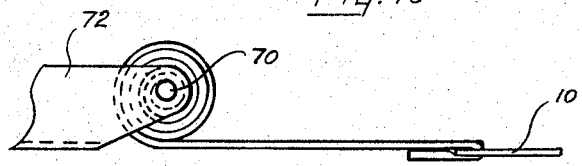

United States Patent Office 3,307,873
Patented Mar. 7, 1967

3,307,873
RETRACTABLE SEAT BELT AND METHOD
OF MAKING SAME
Henry Blaszkowski, 7312 Bingham,
Dearborn, Mich. 48126
Filed Jan. 16, 1964, Ser. No. 338,061
4 Claims. (Cl. 297—388)

This invention relates to retractable automobile or airplane seat belts and more particularly has reference to a seat belt assembly in which the seat belts are automatically self-rolling when not in position about the body of the user.

Seat belt retracting devices are presently available in the form of spring-loaded rollers adapted to be attached along the straps of conventional seat belts. Tension in the spring induces a rotation of the rollers which in turn causes each belt strap to roll up about its roller in the form of a spiral. The straps completely roll up about the rollers in this manner until only the belt buckles extend or hang loosely from the strap rolls.

It is the principal object of the present invention to provide a seat belt which retractable without any attached rollers, springs, or other mechanical devices.

This is accomplished by providing a seat belt assembly in which the belt straps are inherently self-rolling, such that each strap is automatically rolled into a spiral form when the user releases the belt from its extended position about his waist.

A further object is to provide a seat belt assembly of this kind in which the straps may be constructed of conventional seat belt fabric material and of the same size and configuration as conventional seat belt straps.

Another object is to provide a method of constructing of self-rolling seat belt of this kind which is simple and adaptable for fabrication with present large-scale production techniques.

In one of several preferred embodiments of the present invention which will subsequently be described in great detail, this is accomplished by adhering a pre-stressed layer of resilient material to a portion of each strap of a conventional seat belt. When a strap is released, the pre-stressed layer rolls upon itself, pulling the strap with it to form a laminated spiral roll. A laminated self-rolling structure of this kind is shown in United States Patent No. 2,826,523, issued March 11, 1958.

An important advantage of the present invention is that it provides a seat belt which is retractable without attaching any external mechanical devices to the belt. There are, therefore, no mechanical appliances which can break or wear out and need replacement. Conventional retracting devices are bulky, and unsightly and cause discomfort to the user who accidentally sits on one of the rolled up belts. The present invention contemplates a belt which is not subject to breakage, and in which no appliances are visible or cause discomfort.

Moreover, the present belt is extremely simple in design and consequently less costly than the conventional retracting devices. In addition, a self-rolling belt of the type herein contemplated may be manufactured with substantially the same equipment recently employed to fabricate conventional seat belts.

It can be seen that the present invention contemplates a self-rolling belt which is extremely simple to fabricate and which costs less than conventional belts having mechanical retracting devices.

Other objects and advantages of the present invention will be more readily apparent from the following detailed description of several preferred embodiments thereof. The description makes reference to the drawings in which:

FIGURE 1 is a plan view of a seat belt strap fully extended employing the present invention;

FIGURE 2 is a side view of the belt shown in FIGURE 1;

FIGURE 3 is the belt shown in FIGURE 2 in rolled position;

FIGURE 4 is a side view of a section of the self-rolling portion of the seat belt strap constructed according to a preferred embodiment of the present invention;

FIGURE 5 is a view similar to that of FIGURE 4 showing another preferred construction of the self-rolling portion;

FIGURE 6 is still another construction of the self-rolling portion of the belt;

FIGURE 7 is a plan view of a section of the self-rolling portion according to another construction of the belt;

FIGURE 8 is a cross-sectional view taken along the lines 8—8 in FIGURE 7;

FIGURE 9 is a plan view of another construction of the belt wherein a leaf spring is incorporated into the self-rolling portion of the belt;

FIGURE 10 is a side of the belt shown in FIGURE 9;

FIGURE 11 is a side view of a press showing a method of constructing the self-rolling portion of the belt;

FIGURE 12 shows the first step in another method of assembling the self-rolling portion of the belt;

FIGURE 13 shows the second step of the method begun in FIGURE 12 of constructing the self-rolling portion;

FIGURE 14 shows another technique of fabricating the self-rolling portion;

FIGURE 15 shows yet another technique of fabricating the self-rolling portion;

FIGURE 16 is a side view of another construction of the self-rolling portion;

FIGURE 17 shows another technique for fabricating the self-rolling portion of the belt;

FIGURE 18 is a plan view of another embodiment of the present invention; and

FIGURE 19 is a side view of the seat belt shown in FIGURE 18.

Referring to the drawings, FIGURES 1–3 show the present invention as employed in a conventional automobile seat belt. A standard buckle or lock 10 is fixed at the end of one of the belt straps, generally indicated at 12, constructed of conventional seat belt fabric material. The opposite end 14 of the strap 12 is fastened to an appropriate anchoring structure (not shown) which is fixed to the vehicle.

The strap 12 comprises a conventional or non-self-rolling section 16 adjacent the buckle 10, and a self-rolling portion 18 extending from the conventional section 16 rearwardly toward the fixed end 14. The section 20 between the self-rolling portion 18 and the fixed end 14 may be of conventional fabric material.

The self-rolling section 18 may be constructed in several different ways, each of which will be described later in detail. This section 18 is self-rolling, which means that, when released, it will attempt to roll up upon itself in the form of a spiral. As shown in FIGURE 3, when the section 18 rolls upon itself in the manner, it also winds the conventional section 16 up with it into the laminated spiral configuration shown at 22.

This is due to the fact that the rearward end of the self-rolling portion cannot move; the end 14 of the strap is anchored to the vehicle. Therefore, the forward end of the section 18, that is, its junction with the conventional section 16, will roll rearwardly toward the anchored end 14. In doing so, the conventional section is wound up in the spiral roll 22, thus translating the buckle rearwardly toward the fixed end 14. The result is the retraction of the belt to the position shown in FIGURE 3.

The self-rolling section 18 may be formed of any suitably strong yet pliable material treated or formed in such a manner as to produce tension and compression forces along the respective opposite faces of the material when the strap is extended in relatively flat or straight position. This "unrelaxed" condition of the section 18 causes it to roll up upon itself when the strap is released. These tension and compression forces can be produced by increasing or decreasing the density of the strap material along one face, by suitably curing one or both faces of the material with heat or chemical treatment, or by other similar means.

FIGURE 16, for example, shows the fabric material 24 covered on one face with a layer of rubber, plastic, or other deformable material 26 which is cured along its outer surface 28 with heat or a chemical solution so as to create sufficient tension in this outer surface 28 to roll the section 18 upon itself when the strap is released. The heat treatment might consist of passing the section 18 around a heated roller or cylinder with the outer surface 28 of the section 18 contacting the cylinder. An alternative embodiment of this construction would be to fabricate the entire self-rolling section 18 of resilient material and treat one surface of this section as described above.

FIGURE 17 shows how the heat or chemical treatment might be accomplished. The section 18 may be conventional fabric suitably coated with plastic or rubber, or it may be constructed entirely of plastic, rubber, or other material. The section 18 is rolled up in a spiral as shown at 29 in FIGURE 17. The rolled-up strap is then subjected to the heat or chemical treatment. As a result, the section 18 acquires a permanent set in its spiraled position and will always return to this position when released.

Alternatively, the section 18 can be actually formed in a spiral position rather than curing it in this position. The plastic or rubber layer can easily be applied by impregnation, coating, or other suitable means to conventional belt fabric in this rolled-up position. If the entire section 18 is of rubber or plastic, techniques are well known in the associated arts for forming the rubber or plastic section 18 in a spiraled configuration.

Another suggested technique for chemical or thermal curing, or for formation of the rubber or plastic layers on the self-rolling section 18, is by looping or rolling the section as it is passed through a heat or chemical bath, or through a rubber or plastic coating solution. This will produce the required spiraled set to the section 18.

FIGURE 4 shows another construction of the self-rolling section 18. A layer of rubber 30 or similar resilient material is placed in tension by suitable means and then bonded in this pre-stressed condition to the fabric material 24 by a layer of suitable adhesive 32. After the adhesive has set, the tension is removed from the rubber material 30. As the rubber layer attempts to return to its unstressed condition, it will roll the section 18 upon itself in the manner suggested in the afore-mentioned Patent No. 2,826,523. In doing so, it will also roll up the non-self-rolling section 16, thus retracting the buckle 10 and forming the spiral shown in FIGURE 3.

In FIGURE 5, the fabric 24 is first bonded by means of an adhesive layer 34 to a layer of rubber or resilient material 36. The pre-stressed rubber layer 40 is then bonded to the rubber layer 36 by means of a second layer of adhesive 38. The pre-stressed layer 40 will produce the same rolling effect described with respect to FIGURE 4. This construction of the self-rolling section 18 avoids the difficulties involved in suitably bonding a pre-stressed panel of resilient material directly to fabric.

FIGURE 6 shows a rubberizing layer 40 on the fabric material 24. This layer may be produced by dipping the fabric in a liquid rubber bath or by spraying the rubber material onto the fabric surface. The pre-stressed rubber layer 30 is then bonded to the rubberizing layer 40 with a layer of adhesive 42. The advantage of this construction of the self-rolling layer 18 is that it avoids the problem of bonding rubber to fabric with an adhesive. Rubberizing a layer of fabric is a very simple process and is well known in the related art.

FIGURES 7 and 8 show the fabric material 24 of the self-rolling section 18 with a series of spaced transverse grooves 44. Alternatively, a series of spaced transverse ridges or spaced holes might be employed. When the pre-stressed layer of rubber is bonded to the fabric, an increased tendency to roll is produced. This is due to the fact that the surface of the fabric contacting the pre-stressed rubber layer is less "dense" than the ordinary fabric material and does not undergo substantial compression as it rolls up about the rubber layer. When ordinary or "uncondiitoned" fabric is used, the fabric layer will roll with the rubber layer but not as readily since there is greater compression of the fabric material along the inside surface of the rolled fabric layer.

An alternative construction (not shown) of the "conditioned" fabric employs a substantially porous fabric surface at least on the side of the fabric layer which contacts the pre-stressed rubber.

If desired, "unconditioned" fabric material could be used with a "conditioned" rubber layer applied thereto. This could be accomplished by decreasing the density (or increasing the porosity) of the rubber layer 36 or 40 of FIGURE 5 or 6. As described above, this could take the form of grooves, ridges or holes which would decrease the compression in this layer as it rolls up with the pre-stressed layer 30.

In FIGURES 9 and 10 the self-rolling section 18 comprises a layer of fabric 46 and a spiral leaf-spring 48 fixed to the fabric layer. The spring 48 may be fixed thereto by small screws, clamps or other suitable means. If desired, the spring could fit slidingly in small pockets in the fabric. The fabric material might be formed in two separate layers to form a continuous inner passage or pocket along the length of the self-rolling section 18 in which the spring would extend. When the spring moves to its relaxed spiral it rolls the entire strap with it in the manner previously described.

The leaf-spring might also be constructed by coating the fabric with plastic material and then curing it in the manner previously described so that it assumes a normal spiral position when the belt is released. The plastic layer might be coated on the fabric while the fabric is in a rolled up position or while it is in a looped or bent position.

In the constructions of FIGURES 4–8, the pre-stressed rubber layer 30 is bonded to the fabric or rubber below with an adhesive. FIGURES 11–15 show several methods of bringing these respective layers into contact while maintaining the tension in the pre-stressed layer.

In the previously mentioned patent, it is suggested that the pre-stressed layer is bonded to the second layer of material while the latter is in a flat dormant position. FIGURE 11 illustrates the manner in which this might be accomplished. A press 50 descends to force the pre-stressed layer 30, suitably clamped in its stretched condition, down against the fabric or base layer 24 which is covered with a layer of adhesive 30. The press and the clamping means remain thus actuated until the adhesive has permanently set.

FIGURES 12, 13 and 14 show a second method of bringing the respective layers into contact. A sheet of rubber or similar material 30 is fixed at its ends by means of clamps 52 to the ends of a loosely slung section of adhesive coated fabric material 54. As the clamps are pulled away from each other, the rubber layer 30 is stretched and the loosely hung fabric 54 is pulled into a horizontal position abutting the stressed rubber 30. An adhesive is employed here which does not set immediately on contacting the rubber layer 30. The joined rubber and fabric layers are next passed over a roller or cylinder 56 as shown in FIGURE 13. The adhesive sets immediately as this layered structure passes over the roll.

This is accomplished by applying sufficient pressure at the roller to cause the adhesive to set, or alternatively, a heat setting adhesive and a heated roller might be employed.

Inducing the adhesive to set as the rubber and fabric pass over a curved surface as shown in FIGURE 13 results in improved rolling qualities in the seat belt strap. Apparently, this is the result of tensile and compressive forces created in the fabric by the adhesive when the strap is extended into its straight position for use. Moreover, I have found that adequate rolling quality results when the fabric and rubber are passed about a roller in the manner opposite to that shown in FIGURE 13, with the roller 56 contacting the fabric 54.

An alternative method shown in FIGURE 14, of bringing the rubber and fabric layered structure into setting contact with a curved surface is to roll it up in spiral fashion about a shaft 57 rather than pull it over a roller.

FIGURE 15 shows another method of bringing the fabric and stressed rubber layers into setting abutment along a curved surface. A clamp 60 holds the rubber and fabric layers, 30 and 24, in position abutting an elongated resilient cushion or pad 62 supported on a base 63. The fabric 24 lies flat upon the upper surface of the cushion 62 with a layer of adhesive 32 along its upper face. The rubber layer 30 is clamped at its upper end with a clamp 64 suitably fixed to produce tension in the rubber layer between the two clamps. This second clamp 64 is situated slightly above the cushion 62 so as to produce a small angle between the rubber layer 30 and the cushion.

A roller or shaft 66 extends across the width of the layers of material and holds the rubber 30 and fabric 24 down against the resilient cushion 62 so as to cause the latter to be depressed as shown in FIGURE 15. As a result, the fabric and rubber are disposed about the curved lower surface of the roller 66. The roller 66 is then translated horizontally along the cushion in the direction of the clamp 64. This advancing motion brings successive portions of the rubber layer 30 into abutment with the fabric below, this abutment occurring along the curved surface of the roller. The adhesive employed sets upon contact of the two layers adjacent the roller surface. If desired, the initial "non-rolled" section of fabric and rubber material adjaecnt the clamp 60 could be cut off from the remaining self-rolling structure.

Another construction of the self-rolling section 18 of the present invention comprises an independent self-rolling laminated panel of rubber or similar material applied by adhesive or other means to the strap fabric material. The difficulty inherent in this construction is that either the fabric material or the panel will attempt to "gather" or slip with respect to the other layer when the self-rolling panel rolls up. This is due to the fact that the panel does not reduce in length as it rolls, as is the case with a pre-stressed layer of rubber material. It is well known that two relaxed layers of material will slip with respect to each when they are rolled together into a spiral configuration. To compensate for this slippage, the self-rolling panel may be stretched and then bonded to the fabric with the inside or inner rolling face of the panel in abutment with the fabric. The panel will reduce in length as it rolls up with the fabric along its inner face.

In each of the embodiments of the self-rolling section 18 described above which included a fabric layer 24, this fabric layer may be merely the extension of the non-self-rolling fabric section 16. This permits the strap to be constructed of a conventional strip of fabric suitably treated along half of its length to create a self-rolling portion.

Alternatively, two different sections of fabric, suitably fixed together at their ends, might be utilized to create the sections 16 and 18. If desired, the self-rolling section 18 might be constructed without fabric material but employing self-rolling means of the type described with respect to the above embodiments of the invention.

In an alternative embodiment of the seat belt, as shown in FIGURES 18 and 19, the end of the self-rolling section 18 is fixed to a rotatable roll or pin 70 located on the anchoring structure 72 fixed to the vehicle. Alternatively, the pin 70 could be located in the buckle housing, or in its own housing situated adjacent the projection of the strap between the cushions of the seat. When released, the self-rolling portion of the strap, which may extend the entire length of the strap, will roll up about the roll or pin. It can be seen that the roll or pin 70 need not be spring actuated but only freely rotatable in its support.

Although the drawings and the above description have referred solely to one of the two straps which comprise a seat belt assembly, it should be clear that generally in each construction of the belt strap, both straps are to be constructed in the same manner. If it is desirable, however, only one of the straps may be self-rolling; the other strap will then resemble a conventional seat belt.

Having thus described my invention, I claim:

1. The method of constructing a self-rolling seat belt strap comprising clamping a base layer and a layer of resilient material together at at least two spaced apart points with a suitable adhesive between said layers, said base layer extending loosely between the clamps, and increasing the spacing between said clamps and thereby stretching said resilient layer and removing the slack from said base layer so as to bring said two layers into abutment along their lengths.

2. The method of claim 1 including passing the abutting layers over a roll so as to set said adhesive.

3. The method of claim 1 including rolling the abutting layers up in spiral fashion about a central shaft so as to set said adhesive.

4. The method of constructing a self-rolling seat belt strap comprising placing a base layer on a flat resilient surface, clamping said base layer and the end of a strip of resilient material adjacent to said resilient surface, clamping the other end of said strip forward of said first clamp at a point removed from said resilient surface, placing an adhesive between said layer and said strip, forcing a roller against said layer and strip forward of said first clamp, and moving said roller forward along said cushion so as to stretch said strip and force it into abutment with said base layer.

References Cited by the Examiner

UNITED STATES PATENTS

| | | | |
|---|---|---|---|
| 1,370,597 | 3/1921 | Lambert | 156—161 |
| 2,826,523 | 3/1958 | Blaszkowski | 156—160 |
| 3,116,092 | 12/1963 | Spranger | 297—388 |
| 3,163,467 | 12/1964 | Deneau | 297—388 |

FRANK B. SHERRY, *Primary Examiner.*

J. S. PETRIE, *Assistant Examiner.*